United States Patent Office 2,971,003
Patented Feb. 7, 1961

2,971,003

2,2-DIALKYL-4-(PYRIDYL ETHYL)-TETRAHYDROFURAN-4-METHYL CARBAMATE

John Mulvin Parker, Montreal, Quebec, and Burton Kendall Wasson, Valois, Quebec, Canada, assignors to Charles E. Frosst & Co., Montreal, Canada, a corporation of Quebec No Drawing. Filed Nov. 16, 1959, Ser. No. 853,016

2 Claims. (Cl. 260—295)

The present invention relates to novel tetrahydrofuran derivatives and to a method for their preparation.

The novel tetrahydrofuran derivatives of the present invention correspond to the following general formula:

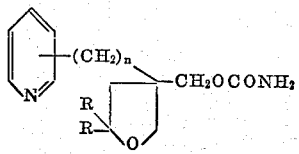

wherein $n$ stands for an integer of from 0 to 5 and R stands for a lower alkyl of from 1 to 4 carbon atoms, and the pharmacologically non-toxic acid salts thereof.

The products of the present invention are prepared by treating the sodio derivative of diethyl 2-(2-pyridyl)-ethylmalonate with methallyl chloride to diethyl methallyl-[2(2-pyridyl)ethyl]malonate which is reduced to the corresponding 2-methallyl 2[2-(2-pyridyl)ethyl]-1,3-propanediol and cyclizing said diol to the 2,2-dimethyl-4[2-(2-pyridyl)ethyl]tetrahydrofuran-4-methanol and treating said compound with phosgene and ammonia to produce the corresponding 4-methyl carbamate. If desired the compounds of the present invention may be reacted with acids to produce pharmacologically non-toxic acid salts thereof.

The products of the present invention have been found to possess analgesic properties at a dose substantially lower than the lethal dose, i.e. about ⅛. After administration of the products of the present invention, the animals appeared quieted, unafraid, and had lost conditioned avoidance responses. Effective doses are listed in Table I.

TABLE I 2,2 - dimethyl - 4[2 - (2 - pyridyl) ethyl] tetrahydrofuran-4-methyl carbamate—Pharmacological effects (mg./kg.)

| $LD_{50}$ mice | $PD_{50}$ | Ataxic Dose$_{50}$ | Analgesic Dose$_{50}$ |
|---|---|---|---|
| 810 | 400 | 230 | 160 (hot plate) 92 (Haffner) |

Pentobarbitone sleeping time prolonged 5 times at 200 mg./kg. (mice).
Conditioned Avoidance Response abolished in rats $ED_{50}$ 140 mg./kg The following example is given to illustrate the preparation or the products of the present invention and is not to be construed as limiting the invention.

EXAMPLE (A) *Diethyl methallyl [2-(2-pyridyl)ethyl]malonate.*—Diethyl 2-(2-pyridyl)ethylmalonate (329 grams) dissolved in 112 ml. anhydrous ethanol was added during ten minutes to 625 ml. of anhydrous ethanol containing 28.6 grams of sodium. The mixture was stirred thirty minutes at 30–35° C. Methallyl chloride (112.5 grams) was added slowly under stirring during 45 minutes with the temperature of the reaction mixture rising to 62° C. The mixture was stirred during one hour and refluxed eight hours. The mixture was cooled to 40° C., water was added, and the ethanol was distilled off using water pump vacuum. The aqueous portion was extracted with ethyl ether, the ether fraction was washed with water, the ether was distilled off, and the residual oil was distilled in vacuo to give 356.6 grams of diethyl methallyl-[2-(2-pyridyl)ethyl]malonate, $b_{0.6-0.19}$ 133–151° C.

(B) *2 - methallyl - 2[2 - (2 - pyridyl) ethyl] - 1,3 - propanediol.*—Diethyl methallyl-[2-(2-pyridyl)ethyl]malonate (356.6 grams) dissolved in 487 ml. ethyl ether was added during 4 hours at a temperature below 30° C. to 63.7 grams of lithium aluminum hydride dissolved in 1592 ethyl ether. During this addition the mixture was stirred and a dark green color developed. The mixture was left overnight at room temperature. The excess lithium aluminum hydride and the complex were decomposed by the addition of water under cooling. The ether was decanted, the solids were repeatedly triturated with ether, the combined ether extracts were washed with water, and the ether was distilled off to give 261 grams of crude 2-methallyl-2[2-(2-pyridyl)ethyl]-1,3-propanediol.

(C) *2,2 - dimethyl - 4[2 - (2 - pyridyl) ethyl] tetrahydrofuran - 4 - methanol.*—Crude 2-methallyl-2[2-(2-pyridyl)-ethyl]-1,3-propanediol (261 grams) was dissolved in 250 ml. tetrahydrofuran. Concentrated hydrochloric acid (90 ml.) was added slowly under cooling and the solution was refluxed for 2 hours. The tetrahydrofuran was distilled in vacuo and the residue was made alkaline by the addition of 44.4 grams of sodium hydroxide dissolved in 88.8 grams of water. The mixture was extracted with ethyl ether, the ether extracts were washed with water, and the ether was distilled to give 237 grams of crude 2,2 - dimethyl - 4[2 - (2 - pyridyl) ethyl] tetrahydrofuran-4-methanol.

(D) *2,2 - dimethyl - 4[2 - (2 - pyridyl) ethyl] tetrahydrofuran-4-methyl carbamate.*—2,2 - dimethyl - 4[2 - (2-pyridyl)ethyl]tetrahydrofuran-4-methanol (122.5 grams) dissolved in 200 ml. tetrahydrofuran was added dropwise at about 15° to 152 grams of phosgene dissolved in 150 ml. tetrahydrofuran. The solution was stirred one hour in an ice bath. The solution of the chlorocarbonate was added at 25° C. to a large excess of concentrated ammonium hydroxide, the tetrahydrofuran was removed by distillation in the steam bath, the residue was cooled, diluted with water, extracted with ethyl ether, the ether layer washed with water, and the ether was distilled to give 146 grams of crude 2,2-dimethyl-4-[2-(2-pyridyl)-ethyl]tetrahydrofuran-4-methyl carbamate. This material was purified by treatment with hydrochloric acid and recrystallization from methanol to give 2,2-dimethyl-4-[2-(2-pyridyl)ethyl]tetrahydrofuran-4-methyl carbamate hydrochloride as white prisms, melting point 198–200° C.

*Analysis.*—Calculated for $C_{15}H_{23}ClN_2O_3$: C, 57.23; H, 7.36. Found: C, 57.11; H, 7.16.

We claim:

1. A member of the group consisting of a compound of the formula;

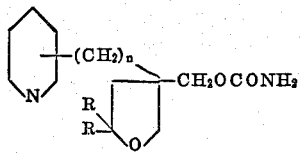

wherein R stands for a lower alkyl radical of from 1 to 4 carbon atoms, and $n$ stands for an integer of from 0 to 5, and the pharmacologically non-toxic acid addition salts thereof.

2. 2,2 - dimethyl - 4[2 - (2 - pyridyl)ethyl]tetrahydrofuran-4-methyl carbmate.

No references cited.